(12) United States Patent
Naylor et al.

(10) Patent No.: US 8,904,945 B2
(45) Date of Patent: Dec. 9, 2014

(54) PACKER WHEEL FOR A DOUBLE SHOOT COULTER ASSEMBLY

(75) Inventors: Matthew Stuart Naylor, Saskatoon (CA); Robin Bruno Schilling, Darfield (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 188 days.

(21) Appl. No.: 13/297,055

(22) Filed: Nov. 15, 2011

(65) Prior Publication Data

US 2013/0118392 A1 May 16, 2013

(51) Int. Cl.
  *A01C 7/06* (2006.01)
  *A01C 5/06* (2006.01)
  *A01B 49/06* (2006.01)
  *A01C 7/20* (2006.01)
  *A01B 23/06* (2006.01)
  *A01B 15/16* (2006.01)

(52) U.S. Cl.
  CPC ............ *A01C 5/068* (2013.01); *A01B 23/06* (2013.01); *A01C 7/06* (2013.01); *A01C 5/064* (2013.01); *A01B 49/06* (2013.01); *A01B 15/16* (2013.01); *A01C 7/206* (2013.01); *A01C 7/201* (2013.01); *A01C 7/203* (2013.01)
  USPC .......................................................... 111/186

(58) Field of Classification Search
  CPC .......... A01C 7/06; A01C 7/206; A01C 7/201; A01C 7/203; A01C 5/068; A01C 5/064; A01B 49/06; A01B 15/16; A01B 23/06
  USPC .......... 111/187, 188, 129, 186; 172/558–566, 172/606, 610
  See application file for complete search history.

(56) References Cited

U.S. PATENT DOCUMENTS

| | | | |
|---|---|---|---|
| 985,589 A | 2/1911 | Harris, Jr. | |
| 2,577,775 A | 12/1951 | Lemmon et al. | |
| 5,609,114 A | 3/1997 | Barton | |
| 5,752,454 A | 5/1998 | Barton | |
| 5,957,219 A | 9/1999 | Friggstad | |
| 6,119,608 A | 9/2000 | Peterson et al. | |
| 6,213,035 B1 | 4/2001 | Harrison | |
| 6,347,594 B1 | 2/2002 | Wendling et al. | |
| 7,540,246 B2 | 6/2009 | Friesen et al. | |
| 7,581,503 B2 | 9/2009 | Martin et al. | |
| 7,681,656 B2 | 3/2010 | Jagow et al. | |
| 7,685,950 B2 | 3/2010 | Friesen | |
| 7,814,847 B2 | 10/2010 | Schilling et al. | |
| 8,015,933 B2 | 9/2011 | Schilling et al. | |
| 8,215,247 B2 * | 7/2012 | Schilling et al. | 111/186 |
| 8,272,339 B2 * | 9/2012 | Schilling et al. | 111/129 |
| 8,448,586 B2 * | 5/2013 | Schilling et al. | 111/186 |
| 8,464,649 B2 * | 6/2013 | Schilling et al. | 111/186 |
| 2002/0056407 A1 | 5/2002 | Milne | |
| 2008/0257237 A1 * | 10/2008 | Friesen et al. | 111/150 |
| 2010/0021099 A1 * | 1/2010 | Torii | 384/544 |
| 2010/0107941 A1 | 5/2010 | Schilling et al. | |
| 2011/0226167 A1 | 9/2011 | Schilling et al. | |
| 2011/0232552 A1 | 9/2011 | Schilling et al. | |

* cited by examiner

*Primary Examiner* — Christopher J Novosad
(74) *Attorney, Agent, or Firm* — Rebecca L. Henkel

(57) ABSTRACT

A double shoot coulter assembly for an agricultural implement includes a packer wheel. The packer wheel is disposed behind a soil engaging blade. The packer wheel is configured to press soil displaced by the soil engaging blade into trenches formed by the soil engaging blade and a disc blade. A centerline of the packer wheel extends adjacent to a soil displacing side of the soil engaging blade.

20 Claims, 5 Drawing Sheets

PACKER WHEEL FOR A DOUBLE SHOOT COULTER ASSEMBLY

BACKGROUND

The invention relates generally to coulter assemblies and, more particularly, to a packer wheel for a double shoot coulter assembly.

In agricultural settings, disc openers are typically mounted to an implement, which is towed behind a work vehicle, such as a tractor. Disc openers are generally configured to form a trench in soil, and to deliver seeds, fertilizer, or other products into the trench. Certain disc openers include a disc, such as a coulter, that cuts into the soil as the disc opener moves along the terrain. A penetration depth of the disc is generally regulated by a gauge wheel positioned adjacent to the disc, and configured to rotate across the soil surface. A vertical offset distance between the disc and the gauge wheel determines the penetration depth (e.g., seed depth, furrow depth) of the disc.

Certain disc openers (e.g., double shoot disc openers) are configured to excavate a trench in the soil that supports two different agricultural products within the trench. For example, a disc may cut a first trench in the soil, and a blade may cut a second trench within the first trench (e.g., into the side of the first trench). As such, a first agricultural product, such as fertilizer may be delivered to the first trench, and a second agricultural product, such as a seed, may be delivered to the second trench. Certain double shoot disc openers include a packer wheel to press soil into the trenches, thereby covering the deposited agricultural products with soil. Unfortunately, due to the position and orientation of the packer wheel, the trenches may not be sufficiently covered with soil. For example, the amount of soil covering the seeds may be uneven, thereby leading to variable seeding depths. Further, the resulting soil surface may include peaks and valleys, resulting in uneven plant emergence and poor yield.

BRIEF DESCRIPTION

In one embodiment, a double shoot coulter assembly for an agricultural implement includes a support structure. The coulter assembly also includes a disc blade rotatably mounted to the support structure and configured to form a trench in a soil surface. The coulter assembly includes a soil engaging blade mounted to the support structure. The soil engaging blade has a first side adjacent to the disc blade, and a second side, opposite the first side, configured to remove soil from a side of the trench. The coulter assembly also includes a packer wheel disposed behind the soil engaging blade, and configured to press soil into the trench. A centerline of the packer wheel extends adjacent to the second side of the soil engaging blade.

In another embodiment, a double shoot coulter assembly for an agricultural implement includes a support structure. The coulter assembly also includes a disc blade rotatably mounted to the support structure and configured to form a first trench in a soil surface for depositing a first agricultural product. The coulter assembly includes a soil engaging blade mounted to the support structure. The soil engaging blade has a first side adjacent to the disc blade, and a second side, opposite the first side, configured to form a second trench within the first trench for depositing a second agricultural product. The coulter assembly also includes a packer wheel disposed behind the soil engaging blade and configured to direct soil into the first and second trenches. A centerline of the packer wheel extends adjacent to the second side of the soil engaging blade.

In another embodiment, a double shoot coulter assembly for an agricultural implement includes a packer wheel disposed behind a soil engaging blade. The packer wheel is configured to press soil displaced by the soil engaging blade into trenches formed by the soil engaging blade and a disc blade. A centerline of the packer wheel extends adjacent to a soil displacing side of the soil engaging blade.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
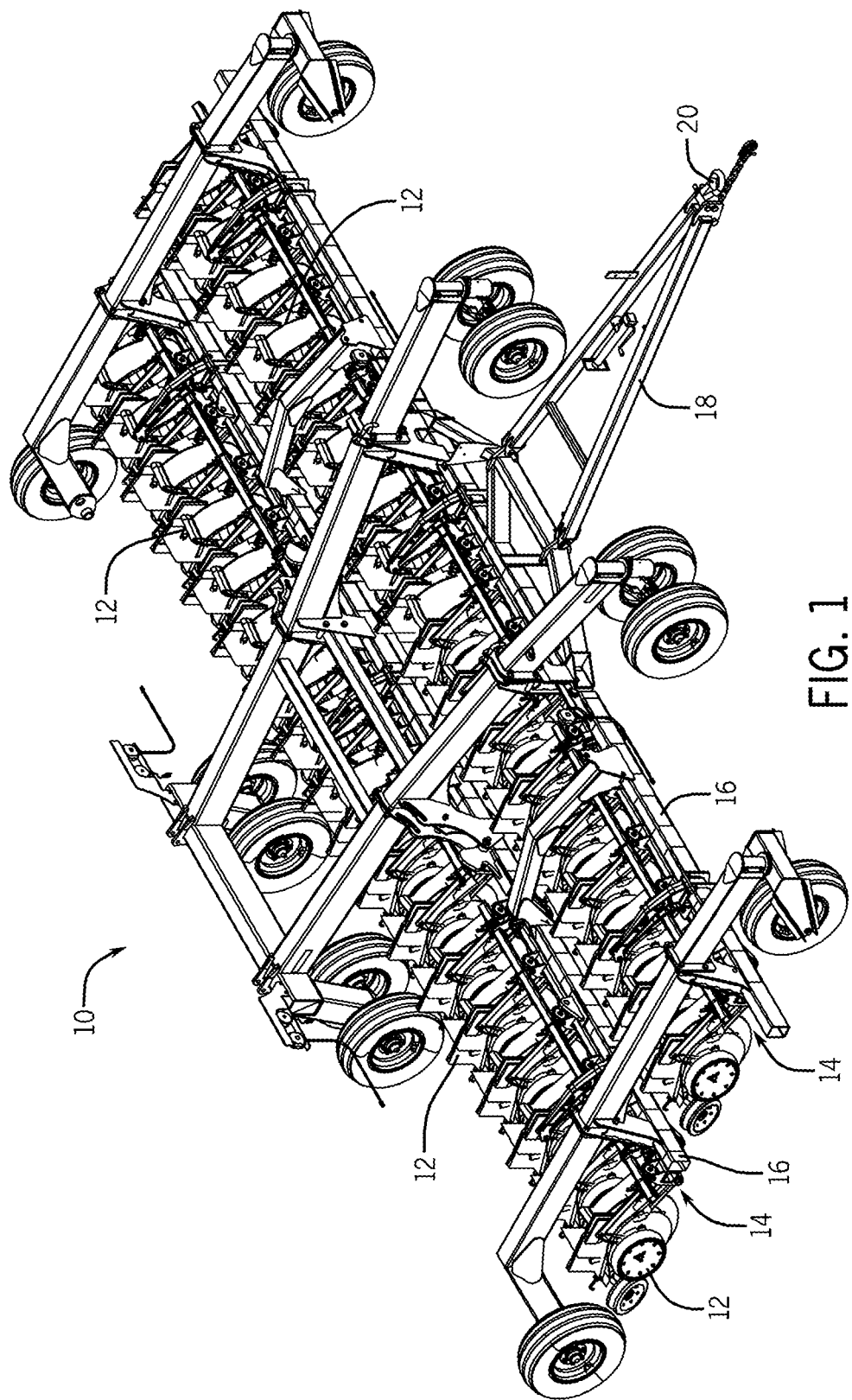
FIG. 1 is a perspective view of a towable agricultural implement including multiple double shoot disc openers.

FIG. 1 is a perspective view of a towable agricultural implement 10, including multiple double shoot disc openers 12. As discussed in detail below, each double shoot disc opener 12 includes a disc (e.g., coulter) configured to form a first trench in soil, and a soil engaging blade configured to form a second trench within the first trench. A product delivery assembly positioned behind the disc is configured to inject one or more products (e.g., seed, fertilizer, etc) into the trenches. As illustrated, linkage assemblies 14 secure the double shoot disc openers 12 to a tool bar 16. In the present embodiment, each tool bar 16 includes 36 double shoot disc openers 12. Further embodiments may include more or fewer double shoot disc openers 12. For example, certain embodiments may include 30, 36, 40, 48, 60, 64, 72, 80, 96, or more double shoot disc openers 12 per tool bar 16. The tool bars 16 are coupled to a tow bar 18, including a hitch 20. The hitch 20 may, in turn, be coupled to a tractor or air cart such that the towable agricultural implement 10 may be pulled through a field.

As discussed in detail below, each double shoot disc opener 12 includes a packer wheel configured to press soil displaced by the disc and the soil engaging blade into the trenches. The packer wheel is oriented and shaped to direct the soil into the trenches to establish a generally even field surface, thereby maintaining consistent seeding depths and enabling plants to emerge from the soil evenly. Further, an even field surface facilitates movement of equipment over the field by reducing the vertical movement associated with uneven field surfaces.

Figure 2:
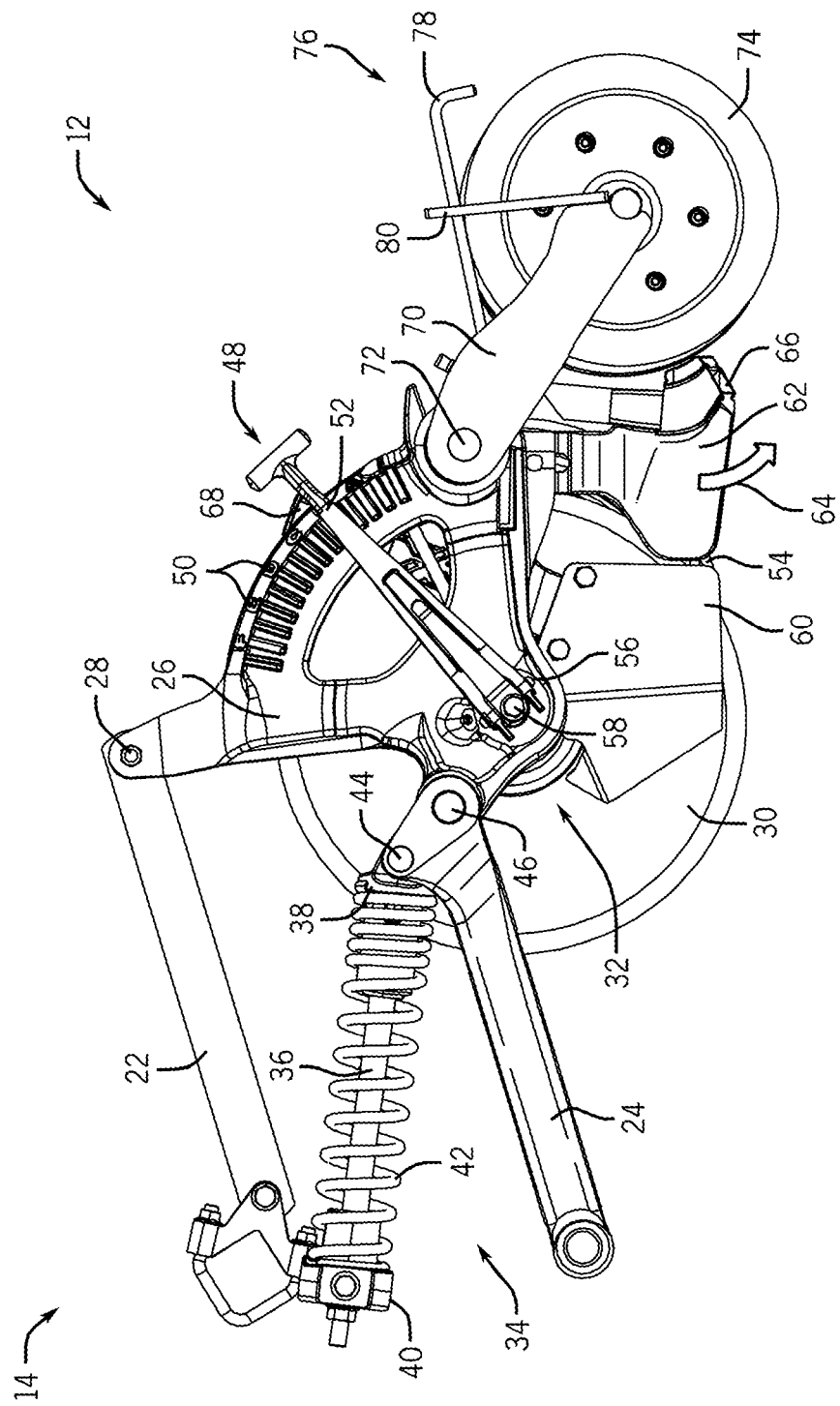
FIG. 2 is a side view of an embodiment of a double shoot disc opener that may be employed within the towable agricultural implement of FIG. 1.

FIG. 2 is a side view of an embodiment of a double shoot disc opener 12 that may be employed within the towable agricultural implement 10 of FIG. 1. The double shoot disc opener 12 (e.g., coulter assembly) is coupled to the tool bar 16 via the linkage assembly 14. The linkage assembly 14 is formed by an upper link 22 and a lower link 24. As illustrated, an end of the upper link 22 is rotatably coupled to a support structure 26 by a fastener 28. The linkage assembly 14 enables the double shoot disc opener 12 to raise and lower relative to the tool bar 16 in response to obstructions or variations in the terrain. The double shoot disc opener 12 also includes a disc 30 (e.g., disc blade, coulter, etc.) rotatably coupled to the support structure 26 by a bearing assembly 32. The bearing assembly 32 enables the disc 30 to freely rotate as the disc engages the soil and forms a first trench. As illustrated, an outer circumference of the disc 30 has a sharpened edge for penetrating the soil.

A hydraulic actuator is configured to adjust a position of the support structure 26 relative to the tool bar 16, thereby compressing and/or decompressing a spring assembly 34. The spring assembly 34 includes a bolt/tube assembly 36 that connects a lower trunnion 38 to an upper trunnion 40. The bolt/tube assembly 36 and lower trunnion 38 are surrounded by a compression spring 42. The upper trunnion 40 of the spring assembly 34 is configured to compress or decompress the spring 42 as its position on the bolt/tube assembly 36 changes. The lower trunnion 38 of the spring assembly 34 is rotatably coupled to the lower link 24 by a fastener 44, thereby enabling the spring assembly 34 to rotate relative to the lower link 24. Furthermore, the lower link 24 is rotatably coupled to the support structure 26 by a fastener 46 to facilitate rotation of the lower link 24 relative to the support structure 26. Extension of the hydraulic actuator causes the upper trunnion 40 to move to compress the spring 42. Eventually, the disc 30 engages the soil and is pushed into the soil. When the spring 42 is compressed, the spring 42 applies a down force that urges the disc 30 into the soil until the gauge wheel rests on the soil surface. In such a position, the spring 42 may still flex and allow the disc 30 to move in response to conditions of the terrain. Retraction of the actuator causes the upper trunnion 40 to move to decompress the spring 42, as the upper trunnion 40 is driven away from the lower trunnion 38. When the spring 42 is sufficiently decompressed, retraction of the actuator will cause the upper trunnion 40 to reach a stop and further retraction of the actuator will cause the disc 30 to be removed from the soil.

The support structure 26 includes a depth adjustment assembly 48 having depth gauge notches 50 and a depth adjustment arm 52. The depth adjustment assembly 48 is configured to adjust a position of a gauge wheel 54 relative to the disc 30. The depth adjustment arm 52 may be manually moved to a desired notch 50 to change the position of the gauge wheel 54. The depth adjustment arm 52 is rotatably coupled to the support structure 26 by a spindle 56 and a fastener 58 that enable the depth adjustment arm 52 to be moved among the depth gauge notches 50. Furthermore, the spindle 56 couples the depth adjustment arm 52 to the gauge wheel 54. Because the gauge wheel 54 travels along the surface of the soil, varying the position of the gauge wheel 54 alters the penetration depth of the disc 30 into the soil. In certain embodiments, the gauge wheel 54 is positioned against the disc 30 to remove soil from a lateral side of the disc 30 during operation.

The double shoot disc opener 12 also includes a scraper 60 disposed adjacent to the disc 30, and configured to remove accumulated soil from the disc 30. Further, the double shoot disc opener 12 includes a soil engaging blade 62 (e.g., scraper, or knife) also disposed adjacent to the disc 30 and adjacent to the scraper 60. The soil engaging blade 62 is configured to form a second trench within the first trench (e.g., within the side of the first trench). The soil engaging blade 62 is configured to direct soil away from the double shoot disc opener 12 in a direction 64 as illustrated. Agricultural product (e.g., seed, fertilizer, etc) may be deposited into the second trench using a seed tube 66 within the soil engaging blade 62. Further, agricultural product may be deposited into the first trench using a seed tube 68 disposed behind the scraper 60. Thus, a first agricultural product and a second agricultural product may be deposited into the trenches.

A support arm 70 is rotatably coupled to the support structure 26 by a fastener 72. A packer wheel 74 is coupled to the support arm 70, and configured to direct soil toward the trenches formed by the disc 30 and the soil engaging blade 62. The packer wheel 74 is also configured to press the soil into the trenches, thereby burying the products within the trenches. Thus, the packer wheel may establish a substantially smooth field surface, thereby facilitating even plant emergence. Further, the packer wheel 74 may press a sufficient amount of soil into the trenches such that the seeds have consistent seeding depths. In certain embodiments, the down force applied to the packer wheel 74 may be varied by an adjustment assembly 76. The adjustment assembly 76 includes a torsion spring 78 that may be moved between notches 80 to set the desired down force applied to the packer wheel 74.

Figure 3:
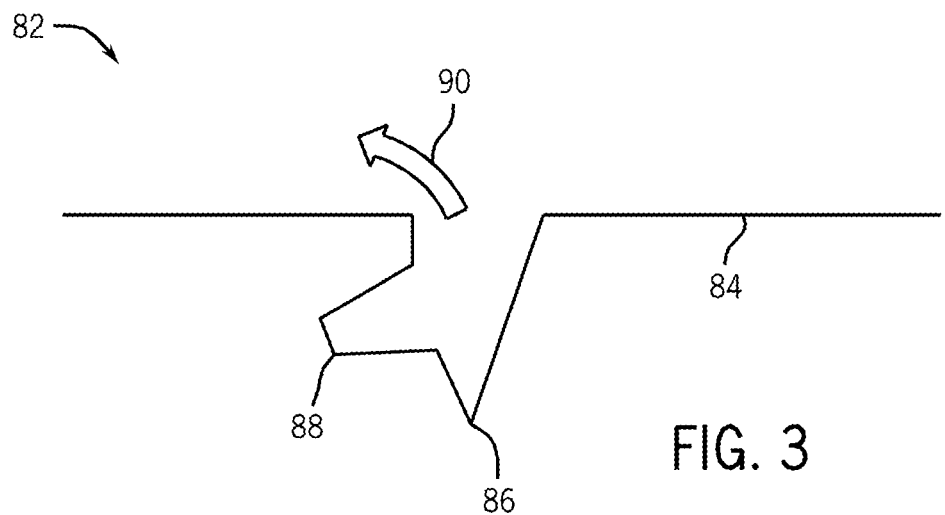
FIG. 3 is a cross-sectional view of trenches that may be formed by the double shoot disc opener of FIG. 2.
Figure 4:
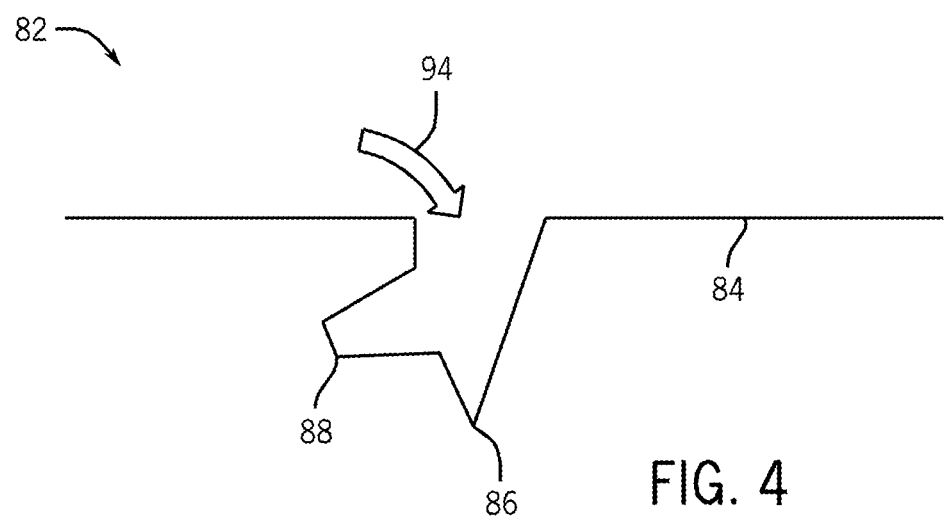
FIG. 4 is a cross-sectional view of the trenches of FIG. 3, illustrating that soil may be directed toward the trenches by a packer wheel of the double shoot disc opener of FIG. 2.

FIG. 3 is a cross-sectional view of trenches 82 that may be formed by the double shoot disc opener 12 of FIG. 2. As the double shoot disc opener 12 moves across a field 84, the disc 30 forms a first trench 86 into which a first agricultural product (e.g., fertilizer, seed, etc.) may be deposited. Further, the soil engaging blade 62 forms a second trench 88 in the side of the first trench 86 by removing soil as shown by arrow 90. A second agricultural product (e.g., seed, fertilizer, etc.) may be deposited into the second trench 88. As will be appreciated, soil is removed from the trenches 86 and 88 and the excavated soil is deposited on the field 84 adjacent to the trenches 86 and 88. FIG. 4 is a cross-sectional view of the trenches 82, illustrating that soil may be directed 94 toward the trenches 86 and 88 by the packer wheel 74 of the double shoot disc opener 12.

Figure 5:
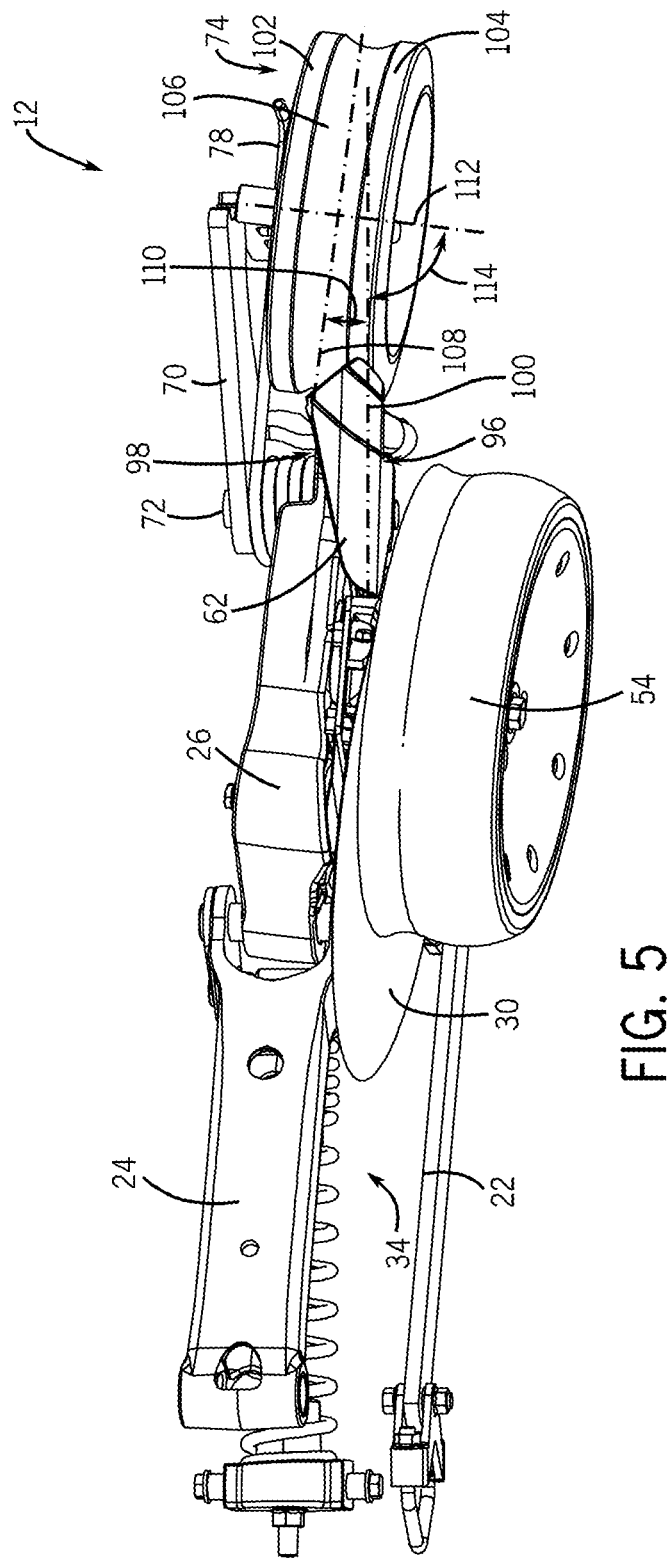
FIG. 5 is a bottom perspective view of the double shoot disc opener of FIG. 2, including an embodiment of a packer wheel.

FIG. 5 is a bottom perspective view of the double shoot disc opener 12 of FIG. 2, including an embodiment of a packer wheel 74. As illustrated, the soil engaging blade 62 has a first side 96 adjacent to the disc 30, and a second side 98, opposite the first side. The second side 98 of the soil engaging blade 62 is configured to remove soil from a side of the trench (e.g., soil displacing side). As illustrated, a longitudinal axis 100 of the soil engaging blade extends through the soil engaging blade 62 from a leading edge to a trailing edge. In certain embodiments, the packer wheel 74 is positioned directly behind the soil engaging blade 62, as shown. In the present embodiment, the packer wheel 74 includes shoulders 102 and 104 extending about an outer circumference of the packer wheel 74, and forming a cavity 106 between the shoulders 102 and 104. Such a shape enables the packer wheel 74 to capture soil within the cavity 106, and to direct the soil toward trenches.

A centerline 108 of the packer wheel 74 extends along the cavity 106 in a forward/rearward direction. As illustrated, the centerline 108 of the packer wheel 74 extends adjacent to the second side 98 of the soil engaging blade 62. Such an alignment enables the packer wheel 74 to capture soil removed and/or displaced by the soil engaging blade 62. An angle 110 is formed between the centerline 108 of the packer wheel 74 and the longitudinal axis 100 of the soil engaging blade 62. In certain embodiments, the angle 110 is an acute angle (i.e., less than 90 degrees). As such, the angle 110 may be approximately 5 to 25 degrees, 10 to 40 degrees, or 15 to 35 degrees, for example.

A rotational axis 112 extends through the pivot of the packer wheel 74. In certain embodiments, an acute angle 114 (i.e., less than 90 degrees) is formed between the rotational axis 112 of the packer wheel 74 and the longitudinal axis 100 of the soil engaging blade 62. In certain embodiments, the angle 114 may be approximately 45 to 65 degrees, 60 to 80 degrees, or 75 to 90 degrees, for example. As illustrated, the packer wheel 74 is toed outwardly relative to the disc 30 and the soil engaging blade 62. With the packer wheel 74 oriented and shaped as illustrated, the packer wheel 74 may direct soil, removed and/or displaced from the trenches by the soil engaging blade 62, back toward the trenches. Thus, the packer wheel 74 may cover seeds with a sufficient amount of soil to provide substantially consistent seeding depths. As such, plants may emerge from the soil evenly.

Figure 6:
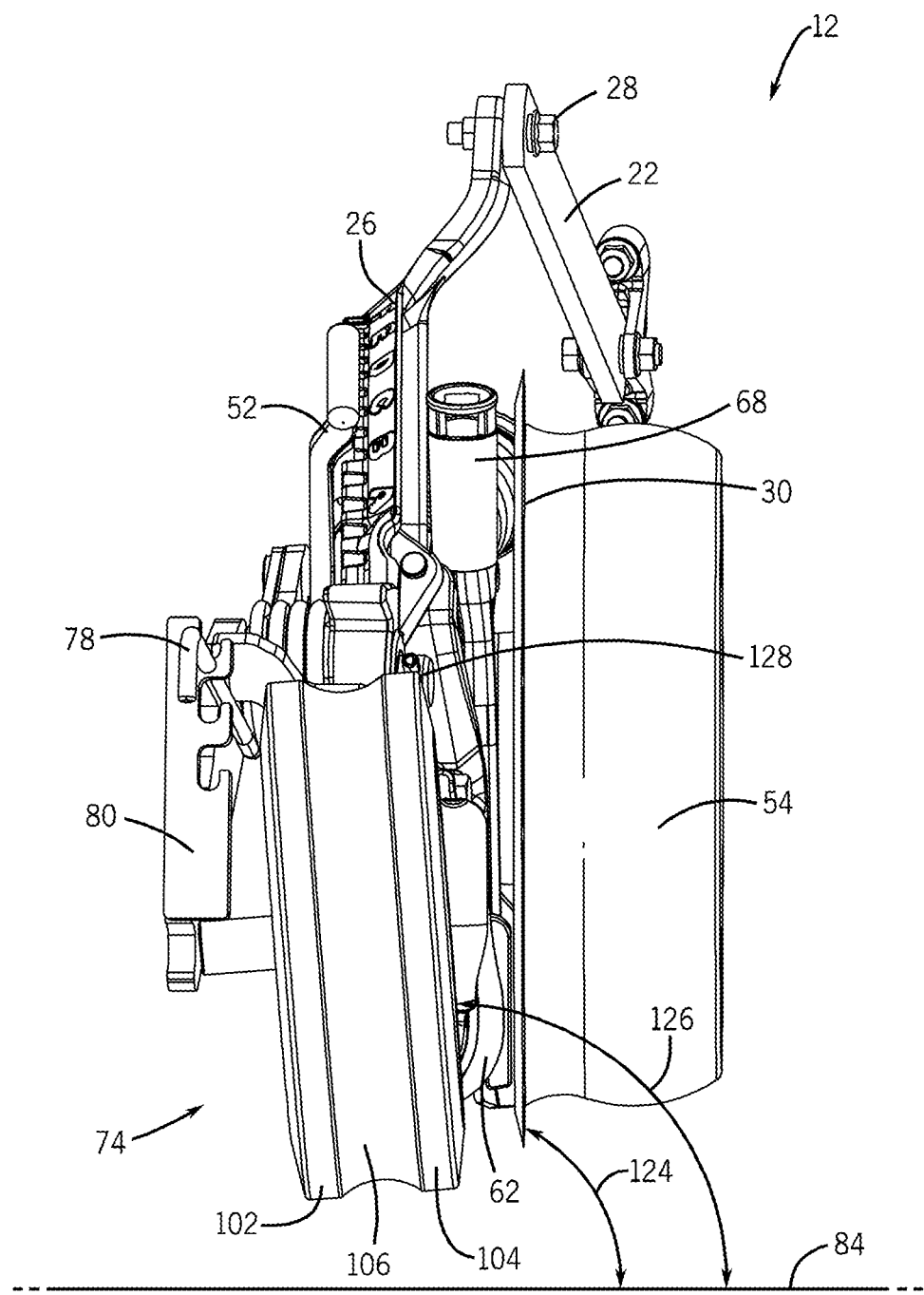
FIG. 6 is rear view of the double shoot disc opener of FIG. 5.

FIG. 6 is rear view of the double shoot disc opener 12 of FIG. 5. In the present embodiment, the disc 30 is oriented at an angle 124 relative to the field 84. For example, the angle 124 may be approximately 80 to 95 degrees. In certain embodiments, the packer wheel 74 may be oriented at an angle 126 that is greater than the angle 124. As such, a top portion 128 of the packer wheel 74 is cambered away from the disc 30. In such a configuration, the angle 126 may be approximately 95 to 100 degrees, 100 to 110 degrees, or 95 to 105 degrees, for example. As will be appreciated, the angle 126 and/or the location of the packer wheel 74 may be particularly selected to direct a desired quantity of soil (e.g., that has been removed from trenches) back into the trenches. As a result, the surface contours of the field 84 may remain substantially flat after the double shoot disc openers 12 passes through the field 84.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A double shoot coulter assembly for an agricultural implement comprising:
   a support structure;
   a disc blade rotatably mounted to the support structure, and configured to form a trench in a soil surface;
   a soil engaging blade mounted to the support structure, the soil engaging blade comprising a first side adjacent to the disc blade, and a second side, opposite the first side, configured to remove soil from a side of the trench; and
   a packer wheel disposed behind the soil engaging blade, and configured to contact soil and press the soil into the trench, wherein the packer wheel comprises an annular cavity extending about an outer circumference of the packer wheel, the annular cavity configured to direct soil into the trench.

2. The double shoot coulter assembly of claim 1, wherein a first intersection of a longitudinal axis of the soil engaging blade and a rotational axis of the packer wheel forms a first acute angle, and a second intersection of the longitudinal axis of the soil engaging blade and a centerline of the packer wheel forms a second acute angle.

3. The double shoot coulter assembly of claim 1, wherein the packer wheel is positioned directly behind the soil engaging blade.

4. The double shoot coulter assembly of claim 1, wherein the packer wheel is toed outwardly relative to the disc blade and the soil engaging blade.

5. The double shoot coulter assembly of claim 1, wherein a rotational axis of the packer wheel is oriented at an angle between 5 and 15 degrees relative to the soil surface.

6. The double shoot coulter assembly of claim 1, wherein the disc blade is oriented at a first angle relative to the soil surface and the packer wheel is oriented at a second angle of between approximately 95 and 105 degrees relative to the soil surface, the second angle being greater than the first angle.

7. A double shoot coulter assembly for an agricultural implement comprising:
   a support structure;
   a disc blade rotatably mounted to the support structure at a first angle relative to a soil surface and configured to form a trench in the soil surface;
   a soil engaging blade mounted to the support structure and configured to remove soil from a side of the trench; and
   a packer wheel disposed behind the soil engaging blade and configured to press soil into the trench, wherein the packer wheel is oriented at a second angle relative to the soil surface greater than the first angle.

8. The double shoot coulter assembly of claim 7, wherein the packer wheel comprises an annular cavity extending about an outer circumference of the packer wheel, the annular cavity configured to direct soil into the trench.

9. The double shoot coulter assembly of claim 7, wherein the second angle is approximately 95 to 105 degrees.

10. The double shoot coulter assembly of claim 7, wherein a first intersection of a longitudinal axis of the soil engaging blade and a rotational axis of the packer wheel forms a first acute angle, and wherein a second intersection of the longitudinal axis of the soil engaging blade and a centerline of the packer wheel forms a second acute angle.

11. The double shoot coulter assembly of claim 7, wherein the packer wheel is positioned directly behind the soil engaging blade and the packer wheel is toed outwardly relative to the disc blade and the soil engaging blade.

12. The double shoot coulter assembly of claim 7, wherein a rotational axis of the packer wheel is oriented at a third angle between 5 and 15 degrees relative to the soil surface.

13. The double shoot coulter assembly of claim 7, wherein the soil engaging blade comprises a first side adjacent to the disc blade, and a second side, opposite the first side, that is configured to remove soil from the side of the trench.

14. A double shoot coulter assembly for an agricultural implement comprising:
   a support structure;
   a disc blade rotatably mounted to the support structure and configured to form a trench in a soil surface;
   a soil engaging blade mounted to the support structure and configured to remove soil from a side of the trench; and
   a packer wheel disposed behind the soil engaging blade and configured to press soil into the trench, wherein a rotational axis of the packer wheel is oriented at a first angle between 5 and 15 degrees relative to the soil surface.

15. The double shoot coulter assembly of claim 14, wherein the packer wheel comprises an annular cavity extending about an outer circumference of the packer wheel, the annular cavity configured to direct soil into the trench.

16. The double shoot coulter assembly of claim 14, wherein the disc blade is oriented at a second angle relative to the soil surface and the packer wheel is oriented at a third angle between approximately 95 and 105 degrees relative to the soil surface, the third angle being greater than the second angle.

17. The double shoot coulter assembly of claim 14, wherein a first intersection of a longitudinal axis of the soil engaging blade and the rotational axis of the packer wheel forms a first acute angle, and a second intersection of the longitudinal axis of the soil engaging blade and a centerline of the packer wheel forms a second acute angle.

18. The double shoot coulter assembly of claim 14, wherein the soil engaging blade comprises a first side adjacent to the disc blade, and a second side, opposite the first side, that is configured to remove soil from the side of the trench.

19. The double shoot coulter assembly of claim 14, wherein the packer wheel is positioned directly behind the soil engaging blade.

20. The double shoot coulter assembly of claim 14, wherein the packer wheel is toed outwardly relative to the disc blade and the soil engaging blade.

* * * * *